Jan. 5, 1932.   J. T. HOLCOMB   1,839,314
ADJUSTABLE BEARING
Filed Oct. 8, 1929
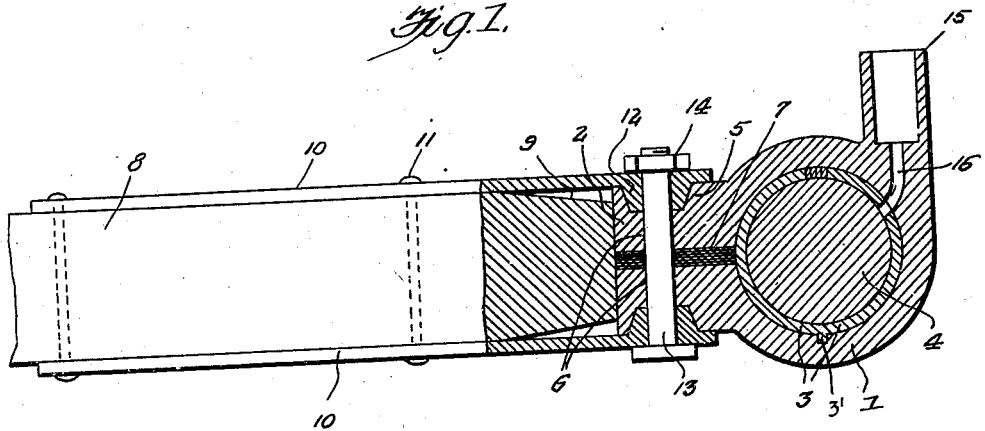
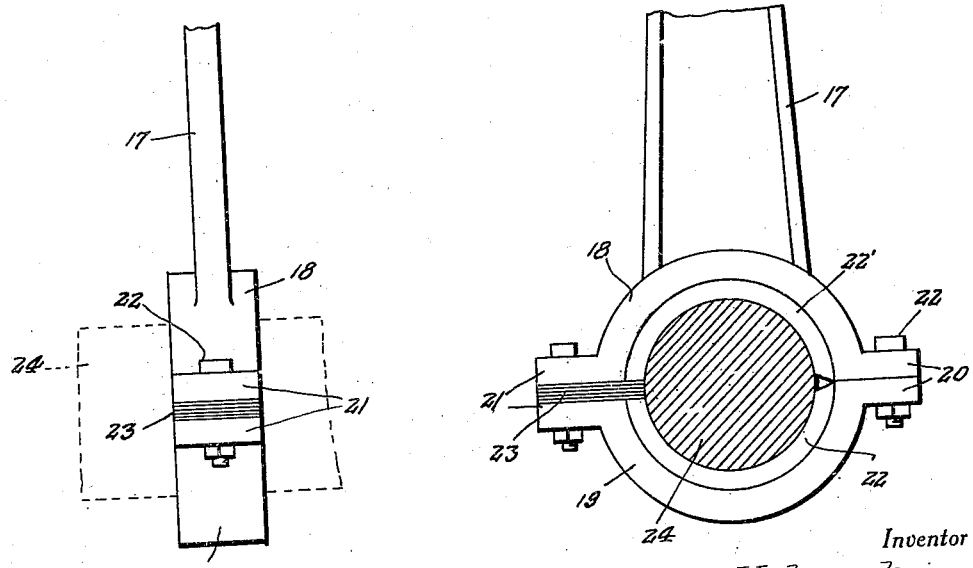
Inventor
John T. Holcomb,
By Clarence A. O'Brien
Attorney Patented Jan. 5, 1932

1,839,314

UNITED STATES PATENT OFFICE

JOHN T. HOLCOMB, OF CAPE GIRARDEAU, MISSOURI

ADJUSTABLE BEARING

Application filed October 8, 1929. Serial No. 398,190.

This invention relates to adjustable bearings and more particularly to devices of this character which are especially adapted for use in connecting a pitman rod of an agricultural implement, such as a mower or reaper with a crank pin, but it is to be understood, of course, that a bearing constructed in accordance with this invention may be used for any purpose for which it is found adapted.

An important object of the invention is to provide, in a manner as hereinafter set forth, an adjustable bearing of the aforementioned character having co-acting means for securing the pitman rod to the bearing and for adjusting said bearing to compensate for wear which has taken place therein.

Other objects of the invention are to provide a bearing of the aforementioned character which will be simple in construction, strong, durable, efficient in its use and which may be manufactured at low cost.

Other objects and advantages of the invention will become apparent from a study of the following specification taken in connection with the accompanying drawings, wherein like characters of reference designate corresponding parts throughout the several views, and wherein:—

Figure 1 is a longitudinal vertical section showing a bearing constructed in accordance with this invention mounted on a pitman rod, the forward portion of the latter being shown in side elevation.

Figure 2 is a side elevation of a modification of the adjustable bearing wherein the same is associated with a connecting rod and crank shaft of the type found usually in internal combustion engines.

Figure 3 is an elevation taken at right angles of the device illustrated in Figure 2.

Referring to the drawings in detail, the reference character 1 designates a substantially circular split bearing box having laterally extending spaced, opposed arms 2 extending therefrom. The bearing box 1 encircles a split bearing 3 which encloses the wrist-pin 4 of the crank shaft or disc of a mowing machine (not shown). As seen in Figure 1 of the drawings the opposed ends of the split bearings are spaced from each other.

The outer faces of the arms 2 are provided with tapered depressions 5 and said arms are further provided with aligned bores 6 extending therethrough and communicating, at their outer ends, with the depressions 5. A plurality of shims 7 are positioned between the opposed faces of the arms 2 and are provided with openings which register with the bores 6 in said arms.

The reference character 8 designates a pitman which is preferably made of wood and the crank end of said pitman is tapered as at 9. 10 indicates longitudinally extending straps or arms which are mounted on the upper and lower sides of the crank end of the pitman through the medium of the transverse securing element 11 and said arms project beyond the adjacent end of the pitman and extend over the arms 2 of the bearing box 1. The opposed inner faces of the free end portions of the arms or straps 10 are provided with inwardly extending tapered projections 12 for insertion in the depression 5 of the arms 2. The arms 10 are further provided with a bore which extends through the projections 12 thereon and is in alignment with the bores in the arms 2 and the shims 7. A headed bolt 13 extends through the bores in the arms 10, projections 12, bearing box arms 2 and the shims 7 and is provided with a threaded nut 14 on one end.

As clearly illustrated in Figure 1 of the drawings, the split circular bearing 3 is disposed in the box 1 in such a manner that the inner end of the space between the arms 2 is closed thereby. The bearing 3 is provided with a longitudinal integral rib 3' which extends into a groove in the inner periphery of the bearing box 1 for the purpose of preventing rotation of the bearing therein. An integral oil duct 15 is mounted on the bearing box 1 and communicates with the interior thereof through the duct 16.

When it is desired to adjust the bearing to compensate for wear, the bolt 13 is removed and the desired number of shims 7 are removed from between the arms 2 after which the bolt is replaced and drawn up tightly in a manner to draw the bearing box arms together with the result that the circular bearing 3 will be pressed snugly around the crank pin 4. The tapered end portions 9 of the pitman 8 permits the free end portions of the arms 10 to be drawn together in a manner to force the arms 2 of the bearing box together when the bolt 13 is drawn up thereon, as will be obvious.

In the modification illustrated in Figures 2 and 3 of the drawings, a connecting rod 17 is shown upon the lower end of which is provided a semi-circular bearing box 18 to which a complementary removable cap 19 is secured through the medium of the outwardly extending ears 20 and 21 and the securing bolt 22. One of the adjacent ends of the elements 18 and 19 and the ears 21 thereon are in spaced opposed relation. A pair of complementary substantially semi-circular bearings 22' are enclosed by the bearing box comprised by the elements 18 and 19 and the ends of the bearing 22' which are adjacent the ears 21 are spaced from each other a distance equal to the spacing of the ears 21, as clearly shown in Figure 2. A plurality of superposed shims 23 are positioned between the spaced ends of the elements 18 and 19 and the ears 21 and extend between the spaced ends of the bearings 22'.

When the bearings 22' become loose due to wear, they may be adjusted to fit snugly about the crank shaft which is designated by the reference character 24 by removing the bolt 22 on the spaced ears 21 and removing any desired number of the shims 23 therefrom after which said bolt is replaced and the bearing box sections 18 and 19 are drawn tightly together to press the bearings 22 into engagement with the crank 24, as will be apparent.

It is believed that the many advantages of an adjustable bearing constructed in accordance with this invention will be readily understood, and although the preferred embodiment of the invention is as illustrated and described, it is to be understood that changes in the details of construction may be had which will fall within the scope of the invention as claimed.

What is claimed is:—

In combination, a pitman, straps mounted on the pitman and projecting beyond one end thereof, opposed conical lugs formed integrally on the inner sides of the projecting end portions of the straps, said straps and lugs having aligned openings therethrough, a split, adjustable bearing, a pair of spaced, opposed ears formed integrally with the bearing adjacent the split, said ears extending between the projecting end portions of the straps, and having conical sockets in their outer sides for the reception of the conical lugs and further having aligned openings therein merging with the sockets and registering with the first named openings, a headed bolt extending through the openings and a retaining nut threaded for adjustment on the bolt, said bolt and nut constituting common means for positively securing the straps to the ears and for adjusting the bearing.

In testimony whereof I affix my signature.

JOHN T. HOLCOMB.